United States Patent
Noonan, III

(10) Patent No.: US 8,671,166 B2
(45) Date of Patent: Mar. 11, 2014

(54) METHODS AND SYSTEMS FOR DEPLOYING HARDWARE FILES TO A COMPUTER

(75) Inventor: Donal Charles Noonan, III, Renton, WA (US)

(73) Assignee: Prowess Consulting, LLC, Seattle, WA (US)

(*) Notice: Subject to any disclaimer, the term of this patent is extended or adjusted under 35 U.S.C. 154(b) by 137 days.

(21) Appl. No.: 11/836,552

(22) Filed: Aug. 9, 2007

(65) Prior Publication Data

US 2009/0043890 A1 Feb. 12, 2009

(51) Int. Cl.
*G06F 15/177* (2006.01)

(52) U.S. Cl.
USPC .......... 709/220; 717/174; 719/321; 719/327; 713/1

(58) Field of Classification Search
USPC ....... 709/218–220; 707/1; 717/174; 719/321, 719/327; 713/1
See application file for complete search history.

(56) References Cited

U.S. PATENT DOCUMENTS

| | | | |
|---|---|---|---|
| 5,745,669 A | 4/1998 | Hugard et al. | |
| 5,802,365 A * | 9/1998 | Kathail et al. | ................ 719/321 |
| 5,822,517 A | 10/1998 | Dotan | |
| 6,108,697 A | 8/2000 | Raymond et al. | |
| 6,122,629 A | 9/2000 | Walker et al. | |
| 6,240,530 B1 | 5/2001 | Togawa | |
| 6,289,512 B1 | 9/2001 | Edwards et al. | |
| 6,330,648 B1 | 12/2001 | Wambach et al. | |
| 6,397,242 B1 | 5/2002 | Devine et al. | |
| 6,496,847 B1 | 12/2002 | Bugnion et al. | |
| 6,636,876 B1 | 10/2003 | Ishihara et al. | |
| 6,704,925 B1 | 3/2004 | Bugnion | |
| 6,711,672 B1 | 3/2004 | Agesen | |
| 6,725,289 B1 | 4/2004 | Waldspurger et al. | |
| 6,735,601 B1 | 5/2004 | Subrahmanyam | |
| 6,785,886 B1 | 8/2004 | Narayan | |
| 6,789,156 B1 | 9/2004 | Waldspurger | |
| 6,795,966 B1 | 9/2004 | Lim et al. | |
| 6,802,054 B2 | 10/2004 | Faraj | |
| 6,816,963 B1 * | 11/2004 | Krithivas et al. | ................... 713/1 |
| 6,912,631 B1 | 6/2005 | Kekre et al. | |
| 6,915,514 B1 * | 7/2005 | Machida | ....................... 717/174 |
| 6,961,941 B1 | 11/2005 | Nelson et al. | |
| 6,968,350 B2 | 11/2005 | Traut et al. | |
| 7,017,144 B2 | 3/2006 | Cohen et al. | |
| 7,039,830 B2 | 5/2006 | Qin | |
| 7,334,099 B2 | 2/2008 | Witt et al. | |
| 7,343,600 B2 | 3/2008 | Caliendo et al. | |
| 7,356,679 B1 | 4/2008 | Le et al. | |
| 7,409,719 B2 | 8/2008 | Armstrong et al. | |

(Continued)

OTHER PUBLICATIONS

Windows Imaging File Format (WIM)—Mar. 2007 (16 pgs).

(Continued)

*Primary Examiner* — Oleg Survillo

(74) *Attorney, Agent, or Firm* — Hunton & Williams LLP

(57) ABSTRACT

A method and system may include deploying a base system image to a computer, identifying a hardware device associated with the computer, and analyzing an archive comprising a node and a hardware file, the node comprising a deployment condition for determining whether to deploy the hardware file to the computer. The method and system may further include analyzing the hardware device to determine whether the hardware device complies with the deployment condition, and deploying the hardware file to the computer if the hardware device complies with the deployment condition.

30 Claims, 8 Drawing Sheets

(56) References Cited

U.S. PATENT DOCUMENTS

| | | |
|---|---|---|
| 7,512,977 B2 | 3/2009 | Cook et al. |
| 7,565,517 B1 * | 7/2009 | Arbon ............... 713/1 |
| 7,577,722 B1 | 8/2009 | Khandekar et al. |
| 7,584,349 B2 | 9/2009 | Sedlack |
| 7,603,440 B1 | 10/2009 | Grabowski et al. |
| 7,624,443 B2 | 11/2009 | Kramer et al. |
| 7,716,743 B2 | 5/2010 | Costea et al. |
| 7,721,284 B2 | 5/2010 | Bykov et al. |
| 7,721,285 B2 | 5/2010 | Imada et al. |
| 7,774,191 B2 | 8/2010 | Berkowitz et al. |
| 7,793,285 B2 * | 9/2010 | Hattori et al. ........... 717/174 |
| 7,913,044 B1 | 3/2011 | Desai et al. |
| 7,953,980 B2 | 5/2011 | Schluessler et al. |
| 2003/0167331 A1 | 9/2003 | Kumar et al. |
| 2003/0187883 A1 | 10/2003 | Zelenka et al. |
| 2003/0195951 A1 * | 10/2003 | Wittel et al. ............. 709/220 |
| 2004/0039926 A1 | 2/2004 | Lambert |
| 2004/0107199 A1 | 6/2004 | Dalrymple et al. |
| 2005/0044301 A1 | 2/2005 | Vasilevsky et al. |
| 2005/0071442 A1 | 3/2005 | Becker et al. |
| 2005/0193245 A1 | 9/2005 | Hayden et al. |
| 2005/0198487 A1 | 9/2005 | Zimmer et al. |
| 2005/0198629 A1 * | 9/2005 | Vishwanath .............. 717/174 |
| 2006/0041883 A1 * | 2/2006 | Chambers et al. ........ 717/174 |
| 2006/0137013 A1 | 6/2006 | Lok |
| 2006/0168576 A1 * | 7/2006 | Phung et al. ............. 717/168 |
| 2006/0233367 A1 | 10/2006 | Birrell et al. |
| 2006/0277542 A1 | 12/2006 | Wipfel |
| 2007/0061818 A1 * | 3/2007 | Williams et al. ......... 719/327 |
| 2007/0078801 A1 * | 4/2007 | Guruprakash ............ 707/1 |
| 2007/0101118 A1 * | 5/2007 | Raghunath et al. ...... 713/2 |
| 2007/0101342 A1 * | 5/2007 | Flegg et al. .............. 719/321 |
| 2007/0124570 A1 * | 5/2007 | Chen et al. .............. 713/1 |
| 2007/0204266 A1 | 8/2007 | Beaty et al. |
| 2007/0214198 A1 | 9/2007 | Fontenot et al. |
| 2007/0226341 A1 | 9/2007 | Mateo |
| 2007/0234302 A1 | 10/2007 | Suzuki et al. |
| 2007/0234337 A1 | 10/2007 | Suzuki et al. |
| 2007/0234356 A1 | 10/2007 | Martins et al. |
| 2008/0077662 A1 * | 3/2008 | Zarenin et al. ............ 709/203 |
| 2008/0092134 A1 * | 4/2008 | Zhang et al. ............. 717/174 |
| 2008/0163194 A1 | 7/2008 | Dias et al. |
| 2008/0244045 A1 | 10/2008 | Fox et al. |
| 2008/0256532 A1 * | 10/2008 | Xie et al. ................. 717/178 |
| 2008/0270583 A1 * | 10/2008 | Gonzalez et al. ......... 709/222 |
| 2008/0278197 A1 * | 11/2008 | Murotake ................. 326/38 |
| 2009/0043890 A1 | 2/2009 | Noonan |
| 2009/0198731 A1 | 8/2009 | Noonan, III |
| 2009/0282404 A1 | 11/2009 | Khandekar et al. |
| 2010/0030878 A1 * | 2/2010 | Grabowski et al. ....... 709/222 |
| 2012/0005673 A1 | 1/2012 | Cervantes et al. |

OTHER PUBLICATIONS

"Understanding VHD (virtual hard disk) options"—Anil Desai, http://searchservervirtualization.techtarget.com/tip/1,289483,sid94_gci1193492,00.html, Jun. 16, 2006, 4 pages.

Virtual Hard Disk Image Format Specification—http://www.microsoft.com/technet/virtualserver/downloads/vhdspec.mspx, Oct. 10, 2005, 3 pages.

Virtual Hard Disk Image Format Specification—http://www.microsoft.com/interop/osp/default.mspx, Oct. 11, 2006—Version 1.0, 17 pages.

Virtual Disk Format 1.0, VMware Virtual Disks, VMWare Technical Note, www.vmware.com, 13 pages.

Virtualization Overview, VMware White Paper, www.vmware.com, 2006, 11 pages.

Virtualization: Architectual Considerations and Other Evaluation Criteria, VMware Whitepaper, www.vmware.com, 2006, 14 pages.

Non-Final Office Action mailed Jun. 8, 2009 in U.S. Appl. No. 11/836,552, 12 pages.

Final Office Action mailed Feb. 4, 2010 in U.S. Appl. No. 11/836,552, 17 pages.

\* cited by examiner

400

From
306

Mount files to support
registry database
402

Obtain Hardware
Configuration File
404

Install HAL files based on
HAL type
406

Update registry database
to point to new HAL files
408

Extract Manifest
410

Enumerate Hardware
Devices
412

METHODS AND SYSTEMS FOR DEPLOYING HARDWARE FILES TO A COMPUTER

BACKGROUND INFORMATION

One challenge in maintaining computer system images is providing support for new or existing hardware platforms. The challenge of maintaining computer system images increases with company scale, particularly with organizations that maintain several computer system images and use a broad number of personal computer and server hardware models. Standardizing hardware models becomes increasingly complex for companies with a worldwide presence, as import/export costs and restrictions may drive the hardware procurement process to involve local vendors.

Conventionally, adding or updating device drivers and hardware-specific applications requires recapturing and/or servicing of computer system images deployed at computers at various locations. As a result, after the computer system images have been updated, computer system images need to be re-replicated to all distribution points, such as to network attached storage, and offline media, e.g., compact discs (CD) or digital versatile discs (DVD).

Modifying computer system images has traditionally been handled in one of two ways, each with associated costs. In a first way, an organization may choose to lower management cost and complexity by managing only a single gargantuan computer system image that includes every driver and application for each and every computer within the organization. For example, an IT staff can create one large computer system image that contains an operating system, productivity and line-of-business software, and all of the drivers for all of the different computers, as well any specialized software required by any of the computers, such as software used by a biometric authentication reader.

Given the multiplicity of hardware permutations possible for all combinations of hardware on the target computers, the aggregate size of all of these files in the computer system image can be enormous. The size of the computer system image may create costs in the time involved to deploy the computer system image to the target computers, as well as in network bandwidth consumed during communication of the large computer system image over a network. Moreover, the computer system image may include hardware-specific applications associated with a particular hardware device, such as a modem, a DVD movie player, a CD/DVD burning program, or a touchpad application, that may be used by some but not all of the target computers. Licensing constraints also may prohibit broad distribution of some hardware-specific applications. Including such hardware-specific applications in the computer system image may violate a license agreement and also may lead to a hardware-specific application being installed on one or more computers that do not have the hardware required to use the hardware-specific application. Complicating this method, operating systems and applications continue to grow in size, which creates a larger computer system image, thus making replication of the computer system image via a network very costly.

A second way of modifying computer system images involves creating multiple, smaller computer system images. Smaller images are easier and less costly to replicate and deploy across a network. For example, the IT staff may opt to save time and bandwidth during an upgrade of target computers by preparing a number of smaller computer system images, such as one image for all laptop configurations, one image for all tablet configurations, and one image for all desktop configurations. However, the time and money saved by the organization in reduced bandwidth and deployment time can easily be lost due to the increased cost and complexity of creating, managing, and administering multiple computer system images during a single upgrade.

A further challenge with modifying computer system images is that the complexity of installing an appropriate driver increases with the number of different models of hardware devices being used by the computers of the organization. Computer manufacturers frequently purchase a hardware device from original equipment manufacturers (OEMs) and may customize device driver software associated with the hardware device. A conflict may occur during installation of a computer system image on a computer when more than one hardware vendor purchases the same hardware device from an OEM, and then customizes the device driver software for the hardware device. Adding multiple device driver sets to a computer system image often results in a driver file conflict if several of the driver files have the same name. For example, a conflict may occur if hardware vendor #1 and hardware vendor #2 both purchase the same video controller chip from an OEM, and hardware vendor #1 decides to add custom functionality and change the device driver software. Even if both device driver files have unique file names, device enumeration and installation is left to chance, as the computer may install whichever device driver file is first evaluated against the hardware device, regardless of whether this is the desired device driver software for the hardware device. In the end, a customized device driver intended for models manufactured by hardware vendor #1 may be installed on a hardware vendor #2 computer, and vice versa.

These and other problems may exist in conventional systems.

SUMMARY OF THE INVENTION

The following describes a method and a system in accordance with exemplary embodiments.

A method in accordance with exemplary embodiments may include deploying a base system image to a computer, identifying a hardware device associated with the computer, and analyzing an archive comprising a node and a hardware file, the node comprising a deployment condition for determining whether to deploy the hardware file to the computer. The method and system may further include analyzing the hardware device to determine whether the hardware device complies with the deployment condition, and deploying the hardware file to the computer if the hardware device complies with the deployment condition.

A system in accordance with exemplary embodiments may include means for deploying a base system image to a computer, means for identifying a hardware device associated with the computer, and means for analyzing an archive comprising a node and a hardware file, the node comprising a deployment condition for determining whether to deploy the hardware file to the computer. The system may further include means for analyzing the hardware device to determine whether the hardware device complies with the deployment condition, and means for deploying the hardware file to the computer if the hardware device complies with the deployment condition.

Another system in accordance with exemplary embodiments may include a processor module to deploy a base system image to a computer. The system may further include a processing logic module to identify a hardware device associated with the computer, analyze an archive comprising a node and a hardware file, the node comprising a deployment condition for determining whether to deploy the hardware file to the computer, to analyze the hardware device to determine whether the hardware device complies with the deployment condition, and to deploy the hardware file to the computer if the hardware device complies with the deployment condition.

BRIEF DESCRIPTION OF THE DRAWINGS

Purposes and advantages of the exemplary embodiments will be apparent to those of ordinary skill in the art from the following detailed description in conjunction with the appended drawings in which like reference characters are used to indicate like elements, and in which:

FIGS. 4A-C illustrate a flow diagram of a method of the processing occurring during execution of a smartpack module in accordance with exemplary embodiments;

These and other embodiments and advantages will become apparent from the following detailed description, taken in conjunction with the accompanying drawings, illustrating by way of example the principles of the various exemplary embodiments.

DETAILED DESCRIPTION OF EXEMPLARY EMBODIMENTS

The description below describes servers, computers, and network elements that may include one or more modules, some of which are explicitly shown in the figures, others are not. As used herein, the term "module" may be understood to refer to software, firmware, hardware, and/or various combinations thereof. It is noted that the modules are exemplary. The modules may be combined, integrated, separated, and/or duplicated to support various applications. Also, a function described herein as being performed at a particular module may be performed at one or more other modules and/or by one or more other devices instead of or in addition to the function performed at the particular module. For modules that are software, a processor or other device may execute the software to perform the functions of the software. Further, the modules may be implemented across multiple devices and/or other components local or remote to one another. Additionally, the modules may be moved from one device and added to another device, and/or may be included in both devices. It is further noted that the software described herein may be tangibly embodied in one or more physical media, such as, but not limited to, a compact disc (CD), a digital versatile disc (DVD), a floppy disk, a hard drive, read only memory (ROM), random access memory (RAM), as well as other physical media capable of storing software, and/or combinations thereof. Moreover, the figures illustrate various components (e.g., servers, computers, network elements, etc.) separately. The functions described as being performed at various components may be performed at other components, and the various components may be combined and/or separated. Other modifications also may be made.

Figure 1:
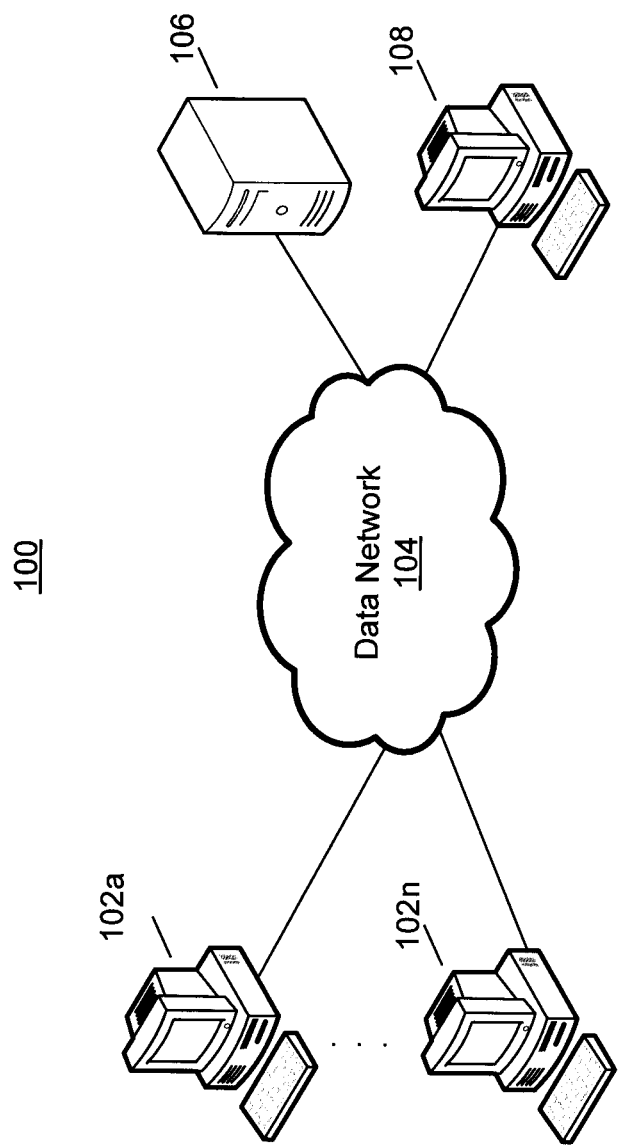
FIG. 1 illustrates a system in accordance with exemplary embodiments.

FIG. 1 illustrates a system in accordance with exemplary embodiments. The system 100 may provide for efficient distribution, management, and deployment of computer system images and hardware files to one or more target computers. The system 100 in accordance with exemplary embodiments may deploy a base system image to one or more target computers to quickly and efficiently replicate the base system image on a group of one or more target computers. In addition to deploying the base system image, the system 100 may identify and tailor distribution of hardware files from an archive based on hardware devices included in a given target computer, instead of deploying a single, one-size-fits-all computer system image that includes all hardware files that may be used by some, but not all, of the target computers in the group. Conventional single, one-size-fits-all computer system images include many hardware files that may not be used by some or most of the target computers, and hence deploying such a one-size-fits-all system image may be wasteful of time, space, bandwidth, and/or other resources. Any organization implementing the system 100 in accordance with exemplary embodiments may achieve substantial savings in terms of time, bandwidth, and administrative complexity when managing and distributing computer system images to one or more target computers.

In an exemplary embodiment, the system 100 may include target computers 102a-102n, a data network 104, a server 106, and a base computer 108. The target computers 102a-102n, the server 106, and the base computer 108 may communicate with one another via the data network 104. The data network 104 may be a wired network, a wireless network, and/or combinations thereof. The data network 104 may transport digital and/or analog data signals using one or more transport protocols, such as, but not limited to, Internet Protocol (IP).

It is noted that system 100 illustrates a simplified system, and that other devices and software not depicted may be included in the system 100. It is also noted that the system 100 illustrates only a single data network 104, a single server 106, and a single base computer 108. It will be appreciated that multiple instances of these devices may be used.

A system administrator or other user may desire to replicate common computer software applications, device drivers, files, data, etc., and/or other information to one or more of a group of target computers 102. The system administrator may install the desired computer software applications, device drivers, files, data, etc., and/or other information on the base computer 108. The system administrator may instruct the base computer 108 to create a base system image of the computer software applications, device drivers, files, data, etc., and/or other information to be commonly deployed to the target computers 102. The base system image may be a copy of the computer software applications, device drivers, files, data, etc., and/or other information installed on the base computer 108. The base system image may be a least common denominator of software and data that the system administrator desires to distribute to a group of target computers 102. For example, the system administrator may create a base system image containing an operating system and productivity and line-of-business applications to be used by each target computer 102 of the group of target computers 102a-102n.

In addition to creating the base system image, the system administrator may use the base computer 108 to create a smartpack module. In an exemplary embodiment, the smartpack module may be a standalone, portable archive that may provide logical and physical separation of software content (i.e., the base system image) from hardware platform support (i.e., hardware files). The portable archive, which may be compressed, may comprise one or more hardware files, and may also contain smartpack executable code. For example, the smartpack module may be a ZIP file where the smartpack executable code uses a commercially available application program interface (API) to extract the relevant hardware files to the target computers 102. Determining which hardware files to extract will be discussed in further detail below.

The separation of software content and hardware platform support may dramatically simplify the impact evaluation process when updating hardware or software of the target computers 102. For example, if a new hardware device (e.g., a new computer model, a new peripheral device, etc.) is introduced to one or more of the target computers 102, the IT staff may update the smartpack module with hardware files to support the new hardware device without modifying the base system image. Separating hardware files from the base system image may decouple the base system image from hardware changes. Updates can be made to the smartpack module, instead of to the base system image. This results in efficiencies as replicating the smartpack module across the data network 104 is more efficient than adding new hardware files to the base system image because the hardware files may be much smaller than the base system image. Typically, a size of all of the hardware files included in the smartpack module may be at least an order of magnitude smaller than the base system image. In another example, if the IT staff desires to add a new software application (e.g., productivity application) to one or more of the target computers 102, the IT staff may update the base system image to add the new software application without an update of the smartpack module 250.

The following describes deploying a base system image to a target computer 102, where the target computer 102 locally accesses and executes the base system image and a smartpack module communicatively coupled to the target computer 102. In an exemplary embodiment, the system administrator may locally deploy the base system image while working on a target computer 102 by reading the base system image from a recordable media (e.g., DVD, CD, Flash Drive, Universal Serial Bus (USB) Drive, etc.) and storing the base system image on a hard drive of the target computer. After the base system image has been deployed, the target computer 102 may access the smartpack module by reading a recordable media and may execute the smartpack module.

It is noted that the smartpack module also may be accessed and executed at the server 106 via the data network 104 or at other locations local or remote to the target computer 102 and that the smartpack module may interact with the target computer 102 via the data network 104. For example, the system administrator may deploy a base system image to one or more of the target computers 102a-102n from the server 106 via the data network 104 and the smartpack module may interact with the target computer 102 via the data network 104. In another example, or the system administrator may deploy the base system image to the target computers 102 from the base computer 108 or other remote computers (not shown) via the data network 104 and the smartpack module may interact with the target computer 102 via the data network 104. Other modifications also may be made.

Figure 2:
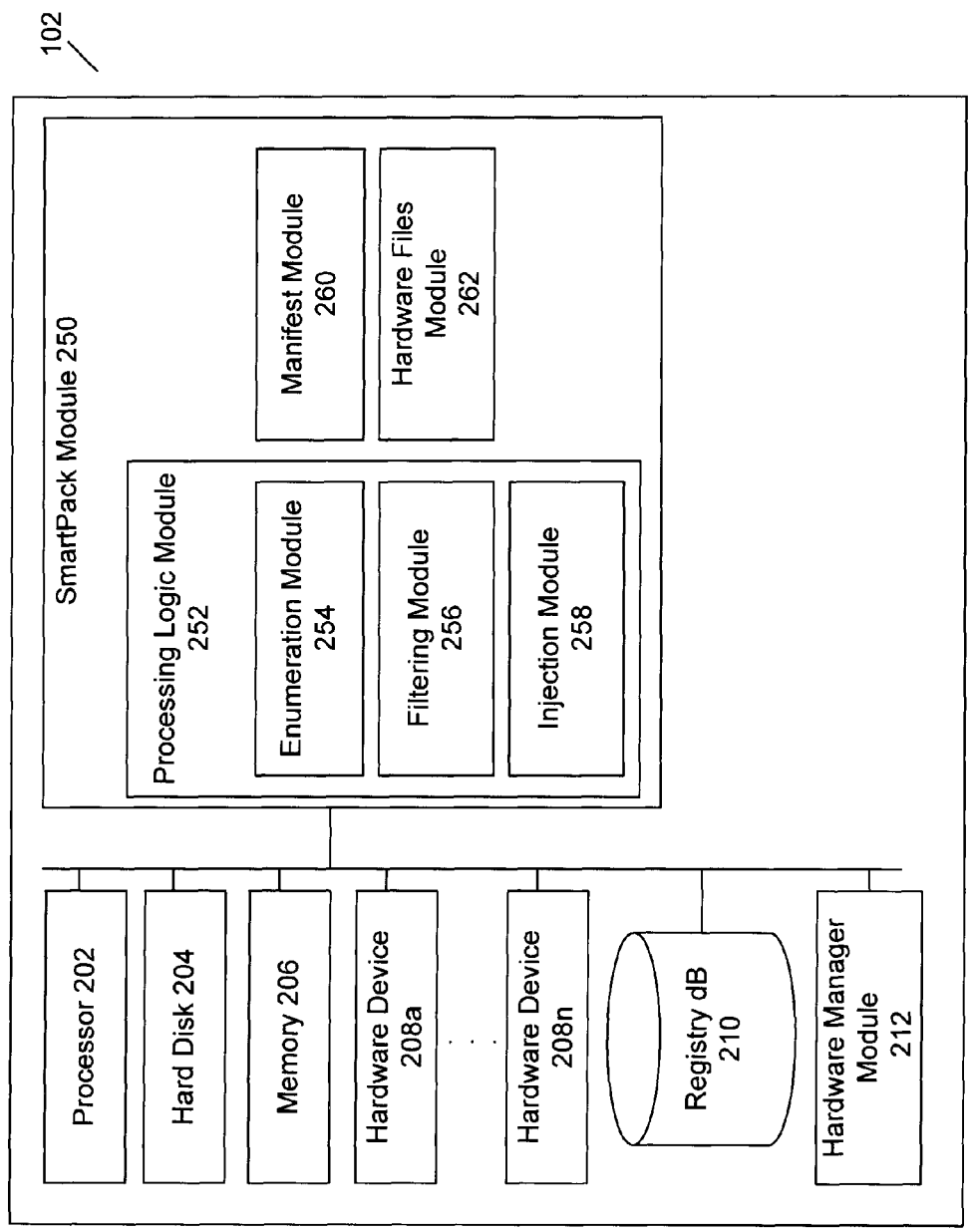
FIG. 2 illustrates various components of a target computer and a smartpack module in accordance with exemplary embodiments.

FIG. 2 illustrates various components of a target computer and a smartpack module in accordance with exemplary embodiments. In an exemplary embodiment, the target computer 102 may include a processor 202, a hard disk 204, a memory 206, one or more hardware devices 208a-208n, a registry database 210, and a hardware manager module 212. The processor 202 may be a central processing unit, a processing module, or other device capable of executing computer code. The hard disk 204 may be a data storage device for the target computer 102, as are well known. The memory 206 may store data loaded from the hard disk 206. The memory 206 may be, for example, a Random Access Memory (RAM) or other device for storing data. The target computer 102 also may include one or more hardware devices 208a-208n, such as, but not limited to, a biometric device, a computer monitor, a video controller, a sound device, a mouse, a network interface card, a peripheral device, a touchscreen, a biometric reader (e.g., a fingerprint reader), or other hardware devices coupled to and communicating with the target computer 102. The target computer 102 may communicate with and/or execute the smartpack module 250 to determine which hardware files to deploy to support the hardware devices 208a-208n.

The smartpack module 250 may be a compressed or a non-compressed archive that contains processing logic and one or more hardware files associated with the base system image. The hardware files may instruct the target computers 102 how to interact with and process information received from the hardware devices 208 of the target computer 102. A hardware file may be one or multiple files used to provide communication between the operating system, and the installed and peripheral hardware devices 208 of a given target computer 102. Examples of the hardware files may include computer programs, platform specific applications, device drivers, or other information to support the hardware devices 208 of a target computer 102. In an exemplary embodiment, a platform specific application may be a software program associated with a hardware device 208 having a specific set of hardware attributes. Examples of platform specific applications include a touchpad customization program, a DVD recording application, a custom hotkeys assignment program, or any application that is used by certain hardware devices 208 found in a specific target computer 102, or is licensed for use on certain target computers 102 having one or more hardware devices 208 with specific hardware attributes.

The smartpack module 250 may identify and deploy hardware files associated with the base system image that are used by the hardware devices 208 of a particular target computer 102. The hardware files that may not be used by the hardware devices 208 of a particular target computer 102 may not be deployed to the particular target computer 102, thus conserving space on the hard disk 204 of the target computer 102. For example, device drivers useable by the hardware devices of a tablet computer would not be deployed to a desktop computer that does include these same hardware devices.

In an exemplary embodiment, the smartpack module 250 may include a processing logic module 252, a manifest module 260, and a hardware files module 262. The manifest module 260 may store a manifest, which may be stored in a compressed state. For example, the manifest may be a compressed extensible markup language (XML) file. The manifest may include representation of a set of nodes that may represent the hardware files stored in the hardware files module 262. Processing of the nodes within the manifest may determine whether to deploy certain hardware files based on the target computer 102 complying with one or more deployment conditions of the nodes.

Figure 6:
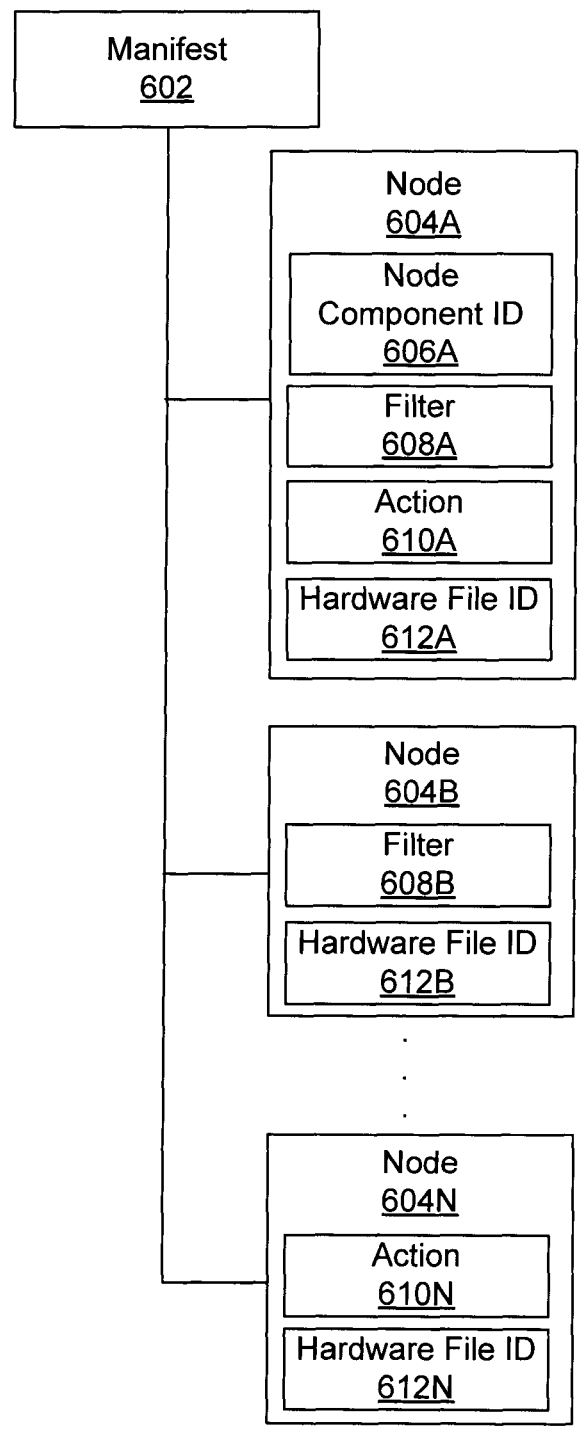
FIG. 6 illustrates a manifest in accordance with exemplary embodiments.

FIG. 6 illustrates a manifest in accordance with exemplary embodiments. In an exemplary embodiment, the manifest 602 may include nodes 604A-604N. Each node 604 may include a hardware file identification (ID) 612, and optionally may include one or more deployment conditions. The hardware file ID 612 may identify a unique storage location of a hardware file associated with the node 604. The hardware files module 262 may use the hardware file ID 612 to identify and retrieve an associated hardware file. In an exemplary embodiment, the node 604 may include deployment conditions based on a node component identification (ID) 606, a filter 608, and an action 610. The node component identification (ID) 606, the filter 608, and the action 610 may be instructions on how to identify and whether to deploy one or more hardware files associated with the node 604 on the target computer 102. In an exemplary embodiment, the nodes may be an XML representation of device driver setup information files.

The node component ID 606 may be used in a comparison to determine if a target computer 102 includes a hardware device 208 with a matching component ID. If a match is identified, this may permit deployment of the hardware file as long as the target computer 102 complies with any other deployment conditions. The filter 608 may include a set of rules to determine if the target computer 102 includes one or more certain hardware devices 208. If the target computer 102 complies with the set of rules, this may permit deployment of the hardware file as long as the target computer 102 complies with any other deployment conditions. The action 610 may identify when during the deployment process to install the hardware file identified by the hardware file ID 612, and what action to take. For example, the action may indicate to install the hardware file during a pre-installation environment, during mini-setup, during user logon, or during other times in the deployment process. If the target computer 102 determines that it is the appropriate time to deploy the hardware file in the deployment process, this may permit deployment of the hardware file as long as the target computer 102 complies with any other deployment conditions.

In the exemplary embodiment depicted in FIG. 6, the manifest 602 includes nodes 604A-604N. In this example, node 604A includes a node component ID 606A, a filter 608A, an action 610A, and a hardware file ID 612A. Before retrieving the hardware file associated with the hardware file ID 612A, the smartpack module 250 may determine whether the target computer 102 complies with each of the deployment conditions of the node component ID 606A, the filter 608A, and the action 610A. If the target computer 102 is found to comply with all of the deployment conditions, the smartpack module 250 may deploy the hardware file associated with the hardware file ID 612A on the target computer 102. FIG. 6 also depicts a node 604B having a filter 608B and a hardware file ID 612B. In this example, the smartpack module 250 may determine whether the target computer 102 complies with the deployment conditions of the filter 608B before deploying the hardware file associated with the hardware file ID 612B. FIG. 6 additionally depicts a node 604N having an action 610N and a hardware file ID 612N. In this example, the smartpack module 250 may determine whether the target computer 102 complies with the action 610N before deploying the hardware file associated with the hardware file ID 612N. A further description of processing the deployment conditions of the nodes 604 in the manifest 602 is provided below in FIGS. 4A-C.

Referring again to FIG. 2, the hardware files module 262 may store all of the hardware files associated with the base system image. In an exemplary embodiment, the hardware files module 262 may store all of the hardware files in a database, with each hardware file being associated with a unique hardware file ID 612. To retrieve a particular hardware file, the hardware files module 262 may receive a query including a hardware file ID 612, may query the database to identify a hardware file associated with the hardware file ID 612, and may respond to the query with the identified hardware file.

The processing logic module 252 may communicate with the processor 202 of the target computer 102 to determine whether the target computer 102 complies with the deployment conditions of the nodes 604. In an exemplary embodiment, the processing logic module 252 may determine which hardware devices 208 the target computer 102 includes and may identify which hardware files to deploy for the included hardware devices 208. For example, the processing logic module 252 may comprise a portable executable (PE). To determine which hardware files to deploy, the processing logic module 252 may include an enumeration module 254 to identify the hardware devices 208 of the target computer 102, a filtering module 256 to filter the hardware files based on hardware attributes of the hardware devices 208, and an injection module 258 to identify and inject certain hardware files of hardware devices 208 to the target computer 102. The enumeration module 254, the filtering module 256, and the injection module 258 will be discussed in further detail below. The following describes deployment of a base system image and executing the smartpack module 250 to identify which hardware files to deploy to the target computer 102 in accordance with exemplary embodiments.

Figure 3:
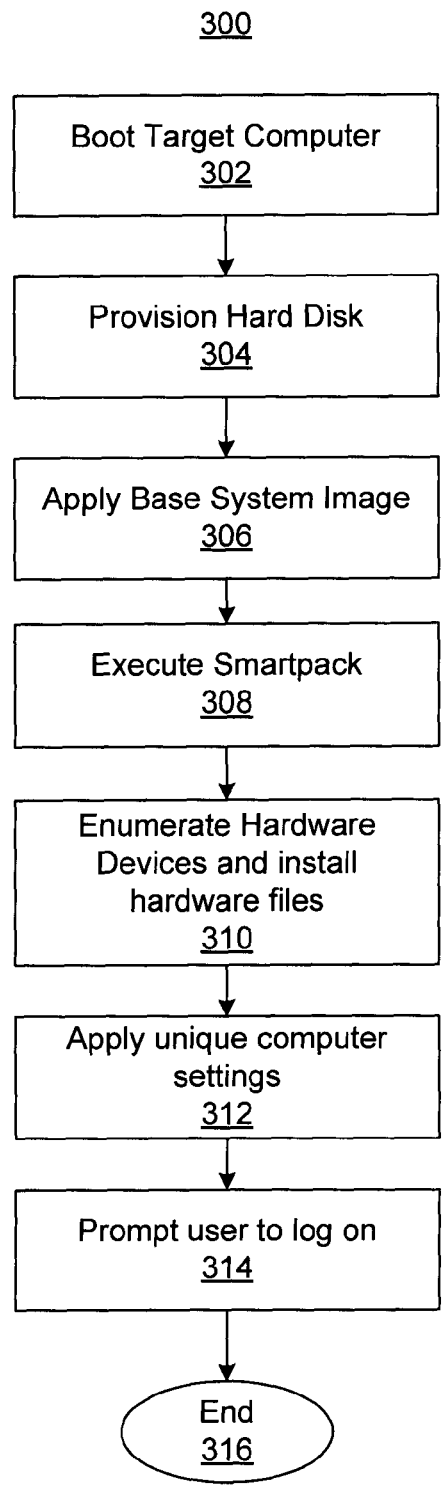
FIG. 3 illustrates a method for deploying a base system image and hardware files to a target computer in accordance with exemplary embodiments.

FIG. 3 illustrates a method for deploying a base system image and hardware files to a target computer in accordance with exemplary embodiments. This exemplary method 300 is provided by way of example, as there are a variety of ways to carry out methods disclosed herein. The method 300 shown in FIG. 3 can be executed or otherwise performed by one or a combination of various systems. The method 300 is described below as carried out by the system 100 shown in FIG. 1 by way of example, and various elements of the system 100 are referenced in explaining the example method of FIG. 3. Each block shown in FIG. 3 represents one or more processes, methods, or subroutines carried in the exemplary method 300. The method 300 may begin at block 302.

In block 302, the method may include booting a target computer. In an exemplary embodiment, the target computer 102 may be switched on and may perform a sequence of operations to load an operating system. The method 300 may continue to block 304.

In block 304, the method 300 may include provisioning a hard disk of the target computer 102. In an exemplary embodiment, the target computer 102 may prepare the hard disk 204 to receive a base system image. The method 300 may continue to block 306.

In block 306, the method 300 may include applying a base system image to the target computer 102 in a pre-installation environment. In an exemplary embodiment, the processor 202 of the target computer 102 may retrieve the base system image from the server 106 or from other local or remote storages devices in a pre-installation environment and may copy the base system image to the hard disk 204. The pre-installation environment may be used to install software and hardware on the target computer 102. The pre-installation environment may be, for example, a Microsoft Windows Pre-installation environment. Other pre-installation environments also may be used. The method 300 may continue to block 308.

In block 308, the method 300 may include executing the smartpack module within the pre-installation environment to identify which hardware files to deploy to the target computer and which of the identified hardware files to inject before exiting the pre-installation environment. The processing that occurs in block 308 will be discussed in further detail below with reference to FIGS. 4A-C. The method 300 may continue to block 310.

In block 310, the method 300 may include entering mini-setup to enumerate hardware devices and install hardware files on the target computer. In an exemplary embodiment, an operating system of the target computer 102 may include a phase during bootup called mini-setup where a list of installed hardware devices may be compared to a set of device driver information files. When a match is found that meets a set of criteria, the device driver information files may be used to copy and install the appropriate hardware files (e.g., device driver files) on the target computer 102. The method 300 may continue to block 312.

In block 312, the method 300 may include applying unique computer settings to the target computer. In an exemplary embodiment, several settings may need to be changed for a given target computer 102 because the base system image may contain settings from the base computer 108 that do not apply to the target computer 102. For example, the target computer 102 may have a different display device, so the display resolution used for the base computer 108 may be incompatible with the target computer 102. The target computer 102 also may be assigned a unique computer name that does not conflict with other computers connected to the network 104. The method 300 may continue to block 314.

In block 314, the method 300 may prompt a user to logon to the computer. In an exemplary embodiment, the operating system of the target computer 102 may cause a computer monitor to display a graphical user interface prompting a user to input a username and password to authenticate and logon the user. The method 300 may continue to block 316 and end.

Figure 4B:
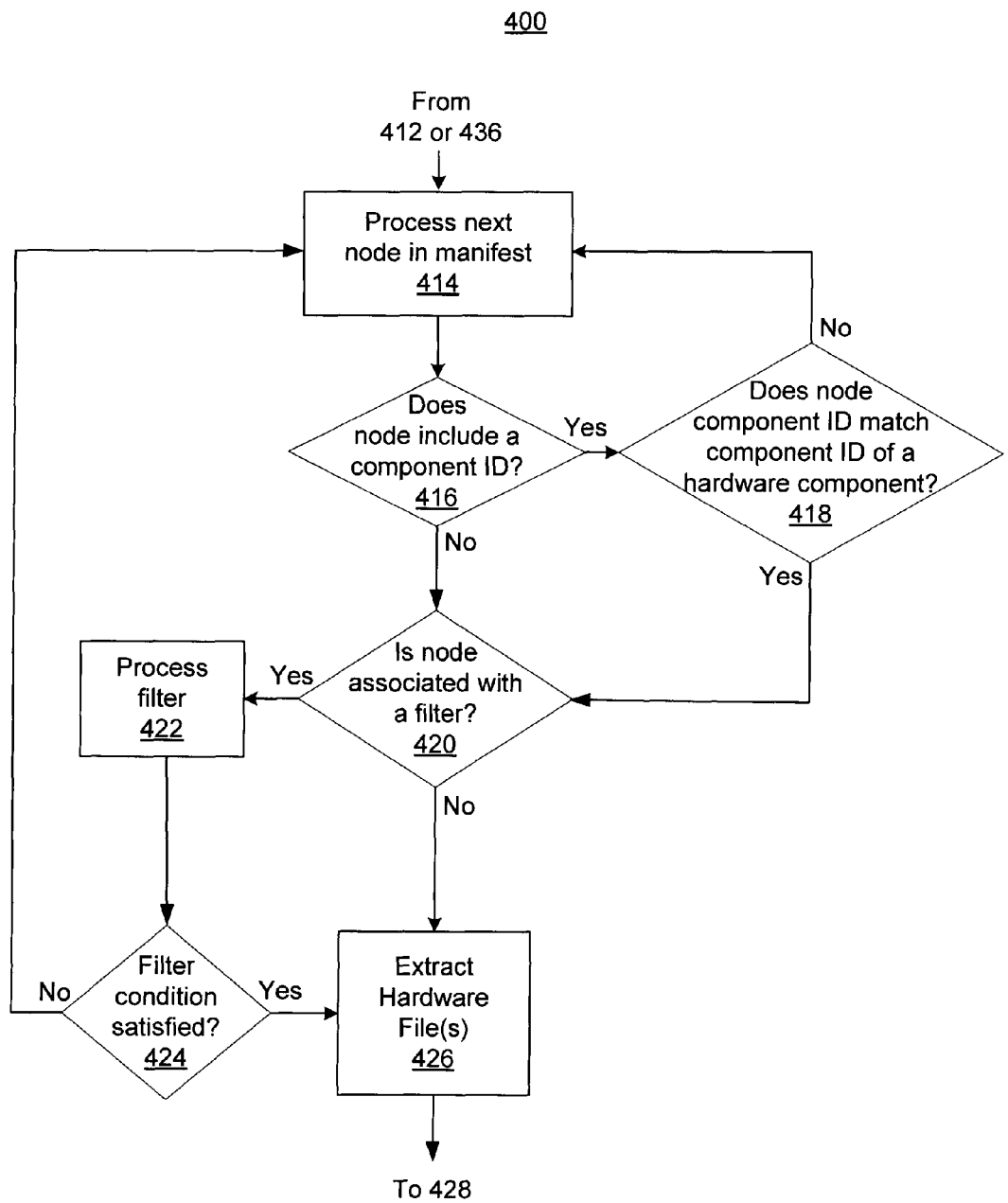
Figure 4C:
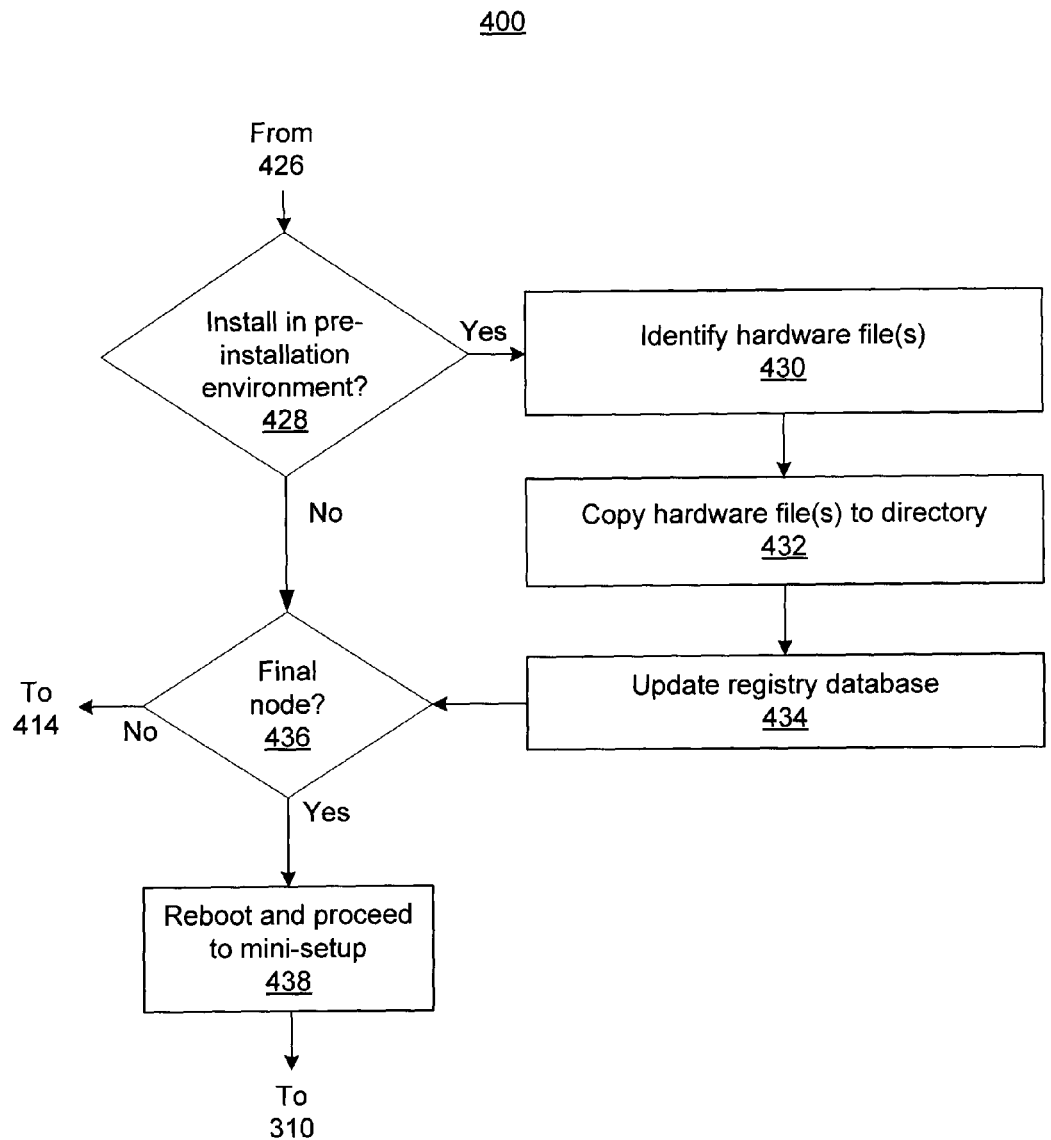

FIGS. 4A-C illustrate a flow diagram of a method of the processing occurring in block 308 of FIG. 3 during execution of a smartpack module in accordance with exemplary embodiments. FIG. 4A describes the exemplary method 400 for identifying hardware devices of a target computer, FIG. 4B describes the exemplary method 400 for determining which hardware files to deploy to the target computer, and FIG. 4C describes the exemplary method 400 for injecting certain hardware files during a pre-installation environment in accordance with exemplary embodiments. This exemplary method 400 is provided by way of example, as there are a variety of ways to carry out methods disclosed herein. The method 400 shown in FIGS. 4A-C can be executed or otherwise performed by one or a combination of various systems. The method 400 is described below as carried out by the system 100 shown in FIG. 1 by way of example, and various elements of the system 100 are referenced in explaining the example method of FIG. 4. Each block shown in FIGS. 4A-C represents one or more processes, methods, or subroutines carried in the exemplary method 400.

FIG. 4A illustrates the method 400 for identifying hardware devices of a target computer in accordance with exemplary embodiments. The method 400 may begin at block 402.

In block 402, the method 400 may include mounting registry database files of a base system image during deployment of the base system image to an offline target computer 102. The term "offline" may refer to the state of the target computer 102 and the base system image when the target computer 102 has been booted by an operating system other than an operating system included in the base system image. In an exemplary embodiment, the enumeration module 254 may identify the registry database files in the base system image and may mount the registry database files that represent a registry database 210 on the target computer 102. The registry database files may be files used to support a registry of the target computer 102 once the base system image has been applied and the target computer 102 has been restarted. The registry database 210 of the target computer 102 may store settings and options of an operating system, hardware, user preferences, non-operating system software, etc. For example, the registry database 210 may be a Windows registry. The method 400 may continue to block 404.

In block 404, the method 400 may include obtaining hardware configuration information of the target computer 102. In an exemplary embodiment, the enumeration module 254 may query the registry database 210 to request a hardware configuration file, and the registry database 210 may respond to the query with a hardware configuration file. The registry database 210 may be, for example, a Windows Pre-installation Environment (WinPE) registry. The hardware configuration file may include information about the hardware configuration of the hardware devices 208 of the target computer 102. The hardware configuration file may identify, for example, the type of hardware abstraction layer of the target computer 102. The hardware abstraction layer may be a software abstraction that permits the operating system of the target computer 102 to communicate with the hardware devices 208. The method 400 may continue to block 406.

In block 406, the method 400 may include processing the hardware configuration file to identify and install appropriate hardware abstraction layer support files in a hard disk of the target computer. In an exemplary embodiment, the enumeration module 254 may parse the hardware configuration file to identify the type of hardware abstraction layer of the target computer 102. The enumeration module 254 may identify one or more hardware abstraction layer support files from the base system image appropriate for the target computer 102 based on the type of hardware abstraction layer. The hardware abstraction layer support files may be a set of files and entries for the registry database 210 appropriate for interacting with one or more of the hardware devices 208 of the target computer 102. The hardware abstraction layer support files may be stored in the base system image in a directory used by the operating system for adding optional components and/or system recovery. In an exemplary embodiment, the hardware configuration file may include a set up information file (INF), one or more dynamic link library (DLL) files, and one or more portable executable (PE) files. The enumeration module 254 may parse the .INF file to identify the appropriate hardware abstraction layer support files for the target computer 102 based on the type of hardware abstraction layer. The enumeration module 254 may then install the identified hardware abstraction layer support files in the hard disk 204 of the target computer 102 at locations defined within the .INF file. The method 400 may continue to block 408.

In block 408, the method 400 may including updating an offline registry database to point to the installed one or more hardware abstraction layer support files. In an exemplary embodiment, the enumeration module 254 may update binaries of the registry database 210 to point to the newly installed hardware abstraction layer support files in the hard disk 204. For example, the binaries may be pointers that point to where the hardware abstraction layer support files are stored in the hard disk 204. During the next restart of the target computer 102, the processor 202 may examine the registry database 210 to identify and process the hardware abstraction layer support files during booting of the target computer 102. The method 400 may continue to block 410.

In block 410, the method 400 may include extracting a manifest to a memory of the target computer. In an exemplary embodiment, the enumeration module 254 may extract a compressed manifest 602 from the manifest module 260, may apply a decompression technique to extract the compressed manifest 602, and may store the extracted manifest 602 in memory 206 (e.g., Random Access Memory)) of the target computer 102. Optionally, the enumeration module 254 may compare the extracted manifest 602 to determine compliance with rules for XML documents. The rules may be, for example, XML scheme definition (XSD) or other rules for ensuring that the extracted manifest 602 is legitimate. The method 400 may continue to block 412.

In block 412, the method 400 may include enumerating the hardware devices on the target computer. In an exemplary embodiment, the enumeration module 254 may query a hardware manager module 212 to enumerate the hardware devices 208 of the target computer 102. The enumeration module 254 may perform enumeration by identifying the hardware devices 208a-208n of the target computer 102 and by identifying a component identification (component ID) for each of the identified hardware devices 208a-208n. In an exemplary embodiment, the hardware manager module 212 may use a Plug-and-Play (PnP) API call to enumerate and return the component ID for each of the hardware devices 208a-208n of the target computer 102. The component ID may be a number, letter, symbols, or other sequence that may be used to distinguish a hardware device from other hardware devices included in the target computer 102. For example, the component ID may be a plug-and-play identification (ID) for each of the hardware devices 208 of the target computer 102. The method 400 may continue to block 414 in FIG. 4B.

FIG. 4B illustrates a method for identifying and extracting hardware files used by hardware devices of a target computer in accordance with exemplary embodiments. The method 400 may continue to block 414.

In block 414, the method 400 may include identifying a next node of the manifest. In an exemplary embodiment, the filtering module 256 may identify a node 604 in the manifest 602 that has not previously been processed. Initially, the filtering module 256 may start at a first node (e.g., node 604A) in the manifest 602. For subsequent device nodes when the method 400 returns to block 414, as discussed in further detail below, the filtering module 256 may identify a next node (e.g., node 604B, then node 604C, and so forth) in the manifest 602 that has not yet been processed. The method 400 may continue to block 416.

In block 416, the method 400 may include determining whether the node includes a node component ID. In an exemplary embodiment, the filtering module 256 may examine the node 604 to determine whether the node 604 includes a node component ID 606. Nodes 604 having a node component ID 606 may be used to indicate that the hardware file associated with hardware file ID 612 of the node 604 is to be deployed to a target computer 102 with a hardware device having a matching component ID. If the node 604 includes a node component ID 606, the method 400 may continue to block 418. If the node 604 does not include a component ID 606, the method 400 may continue to block 420.

In block 418, the method 400 may include determining whether a node component ID of the node matches a component ID of any hardware devices. In an exemplary embodiment, the filtering module 256 may compare the node component ID 606 of the node 604 against the component IDs of the enumerated hardware devices 208 to determine whether one or matches occurs. The filtering module 256 may identify a match if a component ID of an enumerated hardware device 208 is the same as the node component ID 606 of the node 604. If the filtering module 256 does not identify a match, this may indicate that the hardware file associated with this node 604 is not to be deployed on the target computer 102, and the method 400 may continue to block 414 to process the next node 604 in the manifest 602. If one or more matches are identified, the method 400 may continue to block 420.

In block 420, the method 400 may include determining whether the node is associated with a filter. In an exemplary embodiment, the filtering module 256 may determine if the node 604 is associated with a filter 608. A node 604 may include a filter 608, for example, if multiple distinct hardware files may be used by a single hardware device 208 and/or if a license agreement restricts use of a hardware file to hardware devices 208 having certain hardware attributes. The filter 608 may be used to determine which of the multiple distinct hardware files to deploy or which hardware devices 208 have certain hardware attributes that permit deployment of the hardware file. In an exemplary embodiment, the filter may be a WMI Query Language (WQL) query and/or a registry setting. In another example, a single hardware device 208 may be associated with multiple distinct hardware files (e.g., multiple device drivers for a single hardware device) and a filter 608 may be used to determine which of the multiple distinct hardware files to install on the target computer 102. If the node 604 is associated with a filter 608, the method 400 may continue to block 422. If the node 604 is not associated with a filter 608, which may indicate that the hardware file is to be installed on all of the target computers 102, the method 400 may continue to block 426.

In block 422 the method 400 may include processing the filter to determine whether to deploy the hardware file to a target computer 102. In an exemplary embodiment, the filtering module 256 may apply the filter 608 to determine whether to install a hardware file on the target computer 102. The filter 608 may include one or more rules to determine whether to install a hardware file based on whether the target computer 102 includes one or more specific hardware devices 208 having particular hardware attributes. The rules may specify that the hardware device(s) 208 include one or more attributes, such as, but not limited to, a particular computer model, a particular manufacturer, and the presence of specific hardware device (e.g., biometric reader), and/or that the target computer 102 includes one or more certain hardware devices 208. In an exemplary embodiment, an organization may acquire a new hardware device 208 (e.g., a productivity workstation) that includes OEM-bundled software (i.e., a hardware file that is a platform specific application). The OEM-bundled software may have a license constraint limiting use of the OEM-bundled software to a certain hardware device 208 from a particular manufacturer. The license constraint may be implemented as rules in a filter 608 of the node 604. For example, a full version of a CD-burning software may be included with one model of CD burner while a basic version of the same CD-burning software may be included with another model of CD burner. The filter 608 may include a set of rules to identify whether the target computer 102 has the specific hardware device 208 and/or combination of hardware devices 208 to comply with the license or other agreements before installing the OEM-bundled software. The method 400 may continue to block 424.

In block 424, the method 400 may include determining whether the hardware device complies with some or all rules of the filter. For example, the filtering module 256 may apply the rules of the filter 608 to determine whether the hardware device 208 being examined is made by a particular manufacturer. If the hardware device 208 does not comply with some or all of the filter rules, the method 400 may return to block 414 to examine the next node 604 in the manifest 602. If the hardware device 208 complies with all of the filter rules, the method 400 may continue to block 426.

In block 426, the method 400 may include extracting one or more hardware files associated with the node. In an exemplary embodiment, the filtering module 256 may query the hardware files module 262 based on the hardware file ID 612 of the node 604. The hardware files module 262 may return the hardware file associated with the hardware file ID 612 of the node 604 and may extract the hardware file if stored in a compressed state. For example, hardware files module 262 may store the hardware files in a compressed stated, and the filtering module 256 may perform decompression and/or other reconstruction algorithm to reconstruct the hardware files from the compressed state. The filtering module 256 may then communicate the hardware file to a destination directory in the hard disk 204 associated with the hardware device 208. The method 400 may then continue to block 428 in FIG. 4C.

FIG. 4C illustrates a flow diagram of a method for determining whether to inject the hardware file associated with a hardware device during a pre-installation environment in accordance with exemplary embodiments. The method 400 may continue to block 428.

In block 428, the method 400 may include determining whether to install the hardware files associated with hardware device during the pre-installation environment. In an exemplary embodiment, the injection module 258 may install hardware files for hardware devices 208 used during booting of the target computer 102 during the pre-installation environment, and also may install hardware files for hardware devices 208 associated with an action 610 specified by an IT administrator. The IT administrator may include the action 610 in a node 604 to specify that hardware files associated with the hardware device 208 be installed during different stages of the deployment process, such as, but not limited to, during the pre-installation environment. The hardware devices 208 used during booting also may be installed during the pre-installation environment, regardless of whether they are associated with an action 610. Hardware devices 208 used during booting may sometimes be referred to as class critical hardware devices. Such hardware devices 208 may affect the functioning of the target computer 102 after exiting a pre-installation environment as the target computer 102 is booting. In an exemplary embodiment, the injection module 258 may parse a device set up information file (INF) to determine a class identifier of the hardware device 208. The injection module 258 may compare the class identifier to a list of known hardware device classes used during the boot process to identify whether any matches are found. A match may indicate that the hardware device 208 is used during booting of the target computer 102. If the hardware device 208 is not used during booting of the target computer 102 or is not associated with an action, the method 400 may continue to block 436. If the hardware device 208 is used during booting or is associated with an action, the method 400 may continue to block 430. Blocks 430-434 described below may provide for offline injection of hardware files for hardware devices 208 used during booting of the target computer 102 or for hardware devices 208 associated with an action 610.

In block 430, the method 400 may include identifying the hardware files associated with the hardware device 208 used during booting of the target computer 102 or for which an action 610 is associated. In an exemplary embodiment, the injection module 258 may process the hardware file ID 604 of the node 604 included in the manifest 602 to identify the hardware files associated with the hardware device 208 to be injected. The injection module 258 may then extract the identified one or more hardware files from the hardware file module 262. The method 400 may continue to block 432.

In block 432, the method 400 may include examining the registry database and copying the one or more hardware files associated with the hardware device 208 to a directory of the hard disk 204 specified in a set up information file (INF) or in the registry database 210. In an exemplary embodiment, the injection module 258 may parse setup information files (INF) to identify a location within the hard disk 108 of one or more directories associated with the hardware device 208. For example, the directory may be a Windows directory structure. The injection module 258 may copy the one or more hardware files associated with the hardware device 208 to the location of the directory in the hard disk 204. The method 400 may continue to block 434.

In block 434, the method 400 may include updating a registry database to point to the updated one or more hardware files. In an exemplary embodiment, the injection module 258 may update the registry database 210 to point to storage locations of the updated one or more hardware files in the hard disk 204. For example, the injection module 258 may update the registry database 210 specified in a hardware abstraction layer .INF file. The method 400 may continue to block 436.

In block 436, the method 400 may include determining whether the node is the final node in the manifest. If the node 604 is not the final node, the method 400 may return to block 414 to process the next node in the manifest 602. If the node 604 is the final node, the method 400 may continue to block 438.

In block 438, the method 400 may include rebooting the target computer 102 to proceed to mini-setup. Mini-setup may refer to the final phase of information gathering and deployment of the base system image on the target computer 102. Information gathering may prompt a human administrator and/or process an automated script. For example, mini-setup may prompt for computer name, time zone, and other regional or user settings. The method 400 may continue to block 310 of FIG. 3, as described above.

Figure 5:
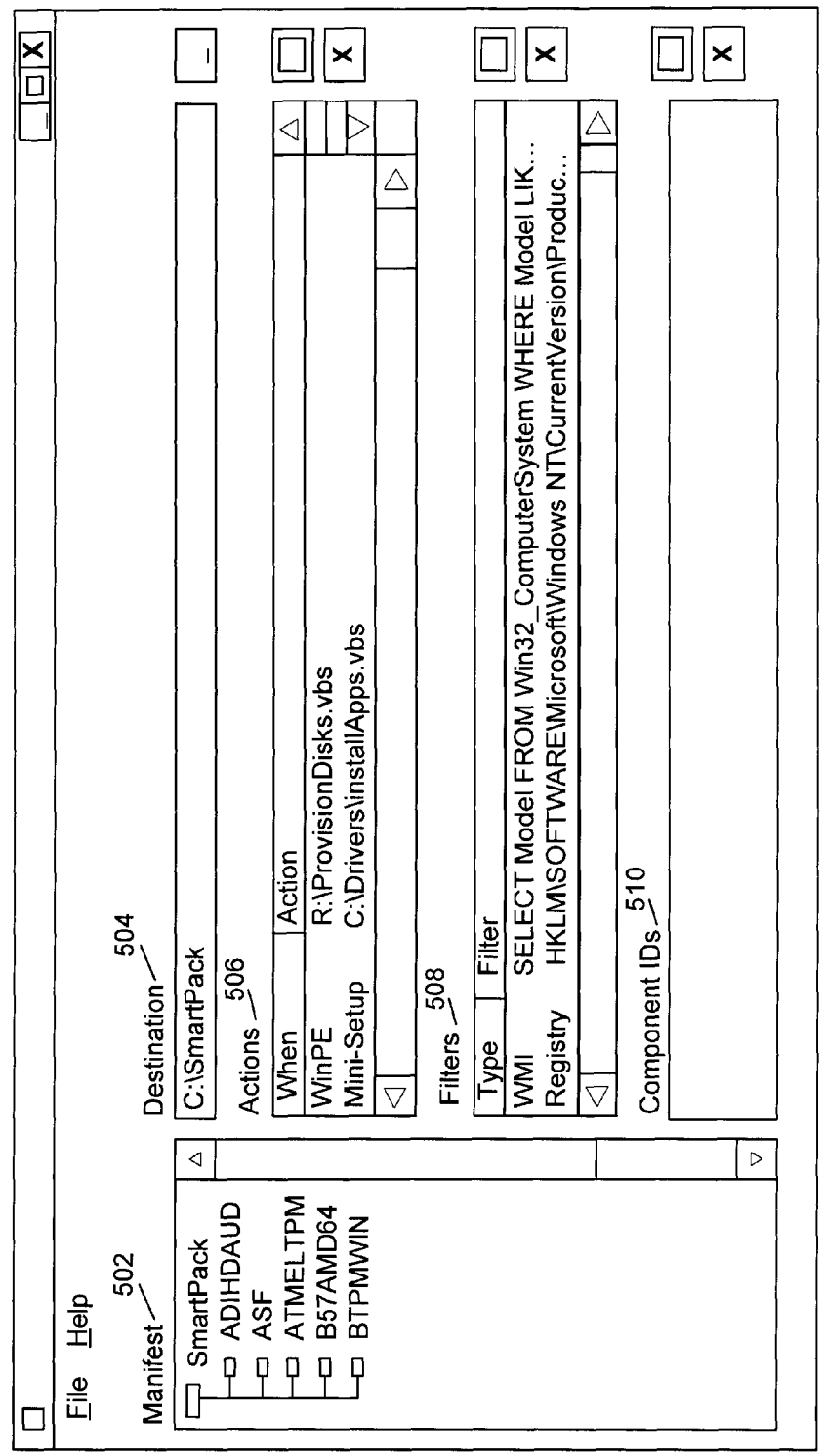
FIG. 5 illustrates a graphical user interface for creating a smartpack module in accordance with exemplary embodiments.

FIG. 5 illustrates a graphical user interface for creating a smartpack module in accordance with exemplary embodiments. An IT professional, for example, may use the graphical user interface 500 to create the smartpack module 250. The graphical user interface 500 may include a manifest display 502, a destination directory 504 of the hardware files, an actions display 506 indicating when various actions may occur, a filters display 508 associated with various hardware devices 208, and a component IDs display 510 listing the hardware devices 208 of the target computer 102 associated with respective filters 608.

In an exemplary embodiment, the manifest display 502 may display a hierarchy of the smartpack contents and nodes 604 associated with hardware files of the smartpack module 250. In an exemplary embodiment, the manifest display 502 may include an Alert Standard Format (ASF) driver node 604 and a burn driver application node 604. The ASF driver may resolve an unknown device node in the Device Manager of the Windows operating system. The ADIHDAUD driver node may install the SoundMax HD Audio device driver. The ATMELTPM driver node may install device driver support for the Atmel Trusted Platform Module (TPM). The B57AMD64 driver node may install device driver support for the Broadcom NetXtreme Gigabit Ethernet network interface. The BTPMWIN driver node may install device driver support for the Broadcom Trusted Platform Module (TPM). The above nodes are exemplary, and nodes associated with other hardware files also may be used.

Selecting one of the nodes 604 within the manifest display 502 may cause display of information associated with the selected node 604 in the destination directory 504, the actions display 506, the filters display 508, and the component IDs display 510. The following describes updating information for a selected node of a manifest displayed by the manifest display 502.

The actions display 506 of the graphical user interface 500 may display when certain actions 610 occur for the selected node 604. The actions display 506 may permit a user to specify when certain actions may occur during different stages of the deployment process. In an exemplary embodiment, the actions display 506 may permit a user to select that an action 610 occurs when the target computer 102 is in a pre-installation environment, when the target computer 102 is in mini-setup, or when a person logs in to the target computer 102. When an action 610 is set to be executed in the pre-installation environment, the smartpack module 250 may run the action to install the hardware files for the associated hardware device 208 when the target computer 102 is in the pre-installation environment. When an action 610 is set to run in mini-setup, the smartpack module 250 may copy the hardware file associated with that action 610 to a storage location associated with the hardware device 208 in the hard disk 204 of the target computer 102, and may update the registry database 210 to set the action 610 to run during mini-setup. When an action 610 is set to run when a person logs on the to the target computer 102, the smartpack module 250 may copy the hardware file associated with that action to a storage location associated with the hardware device 208 in the hard disk 204 of the target computer 102, and may update the registry database 210 to set the action 610 to run when a person logs in to the target computer 102.

The filters display 508 of the graphical user interface may display a type of hardware device or hardware attribute that is filtered and the location of the filter 608 within the target computer 102. The IT staff may select one or more filters from a drop down menu or other location to associate one or more filters 608 with the node 604. Multiple filters 608 can be set for a single node 604, and may be processed using the logical AND operator, for example, during execution of the smartpack module 250.

The component IDs display 510 of the graphical user interface 500 may display node component IDs 606 of the hardware devices 208 supported by the smartpack module 250. In an exemplary embodiment, the nodes 604 may include filters 608 to provide granular control over installation of hardware files, and may be used to determine which hardware files to extract when more than one node 604 contains a matching component ID.

The following describes an example of deploying to a group of target computers 102 a base system image that includes an update to an operating system. The target computers 102 in this example include a mixture of laptop, tablet, and desktop computers. Some of the laptop computers in this example include biometric fingerprint readers for user authentication, while others do not. In this example, the IT staff may install on the base computer 108 the computer programs, hardware files, etc., common to all of the target computers 102. The IT staff may instruct the base computer 108 to create a base system image of the hard disk of the base computer 108, and the base computer 108 may communicate the base system image to the server 106. The IT staff also may create the smartpack module 250 to include laptop biometric hardware files, laptop non-biometric hardware files, tablet hardware files, and desktop computer hardware files. The manifest 602 included in the smartpack module 250 also may include nodes 604 having filters 608 to distinguish between laptop computers with and without biometrics, the tablet computers, and the desktop computers. The base computer 108 may communicate the smartpack module 250 to the server 106. In this example, the smartpack module 250 may be implemented at the server 106 and the server 106 may communicate with the target computers 102a-102n to identify and forward the hardware files used by the respective target computers 102a-102n.

The target computers 102a-102n may be locally or remotely booted and may provision their respective hard disks to receive the base system image. The server 106 may instruct each of the target computers 102a-102n to install the base system image. The smartpack module 250 may communicate with the target computers 102a-102n to determine the appropriate hardware files based on the hardware devices 208 of the respective target computers 102a-102n. For the laptop computers, the smartpack module 250 performs the processing as discussed in FIGS. 4A-C for the laptop target computers 102a-102n. In this example, the smartpack module 250 identifies a node 604 having a filter 608. The filter 608 may distinguish between laptop computers having biometrics and those that do not. After processing the filter 608, the smartpack module 250 communicates the laptop biometric hardware files to laptop computers having biometrics, as well as any other hardware files used by the laptop target computers 102. The smartpack module 250 does not, however, send hardware files that are not used by the laptop target computers 102. For example, the smartpack module 250 may not communicate table computer hardware files or desktop computer hardware files as the laptop computers would not use either of these hardware files.

For the tablet computers, the smartpack module 250 performs the processing as discussed in FIGS. 4A-C for the tablet target computers 102a-102n. In this example, the smartpack module 250 communicates the tablet hardware files to the tablet target computers 102a-102n, but not the hardware files unique to the laptop computers or to the desktop computers.

For the desktop computers, the smartpack module 250 performs the processing as discussed in FIGS. 4A-C for the desktop target computers 102. In this example, the smartpack module 250 communicates the desktop hardware files to the desktop target computers 102, but not the hardware files unique to the laptop computers or unique to the tablet computers.

Thus, the system in accordance with exemplary embodiments may detect what hardware files are used by particular target computers and may deploy the hardware files used by particular target computers. This advantageously does not burden the base system image with hardware files that are used by only a subset of the target computers. Moreover, the system in accordance with exemplary embodiments advantageously uses the smartpack module to separate the base system image from the hardware files. Updates to the hardware files may be made and an update smartpack module may be distributed without involving redistributing the base system image to all target computers. Likewise, the base system image may be updated with involving redistribution of the smartpack module. This separation results in savings in terms of time, bandwidth, and administrative complexity for any organization that approaches deployment of base system images as described herein.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

The invention claimed is:

1. A method comprising:
   creating a module comprising hardware files, wherein the hardware files are represented as a set of nodes, each node including identification of a corresponding hardware file, a node component identification (ID), at least one deployment condition for determining whether to install the hardware file to a target computer, and an indication of when to install the hardware file to the target computer;
   installing a base system image to a computer;
   identifying at least one hardware device associated with the computer;
   analyzing the set of nodes from the module to identify a node having a node component ID that matches identification of the at least one hardware device associated with the computer;
   analyzing the at least one hardware device to determine whether the at least one hardware device complies with the at least one deployment condition of the identified node based on a hardware attribute of the at least one hardware device; and
   installing the at least one hardware file to the computer in the event the at least one hardware device complies with the at least one deployment condition, wherein the at least one installed hardware file is associated with the at least one identified hardware device,
   wherein the indication associated with the identified node indicates installing of the at least one hardware file after the installing of the base system image and before the initial boot of an operating system contained in the base system image.

2. The method of claim 1, wherein the base system image includes information common to a plurality of computers.

3. The method of claim 1, wherein identifying at least one hardware device further comprises mounting a registry database of the computer.

4. The method of claim 3, wherein identifying at least one hardware device further comprises querying the computer to identify a hardware configuration file.

5. The method of claim 4, wherein identifying at least one hardware device further comprises identifying a hardware abstraction layer type of the computer based on the hardware configuration file.

6. The method of claim 5, wherein identifying at least one hardware device further comprises copying a hardware abstraction layer support file to the computer based on the hardware abstraction layer type.

7. The method of claim 6, wherein identifying at least one hardware device further comprises updating the registry database to point to the hardware abstraction layer support file.

8. The method of claim 7, wherein identifying at least one hardware device further comprises enumerating a plurality of hardware devices.

9. The method of claim 1, wherein analyzing the at least one hardware device further comprises:
   identifying a filter associated with the node, the filter comprising a rule; and
   applying the filter to the hardware attribute of the at least one hardware device.

10. The method of claim 9, wherein analyzing the at least one hardware device further comprises determining that the hardware attribute of the at least one hardware device complies with the rule.

11. The method of claim 10, wherein analyzing the archive further comprises extracting the at least one hardware file from the archive if the hardware attribute complies with the rule.

12. The method of claim 1, wherein installing the at least one hardware file further comprises:
   determining that the at least one hardware device is used during booting of the computer; and
   injecting the at least one hardware file during a pre-installation environment.

13. The method of claim 12, wherein injecting the at least one hardware file further comprises:
   analyzing a registry database to identify a storage location on a hard disk associated with the at least one hardware device; and
   storing the at least one hardware file at the storage location.

14. The method of claim 13, wherein injecting the at least one hardware file further comprises updating the registry database to point to the at least one hardware file stored in the hard disk.

15. The method of claim 1, wherein installing the at least one hardware file further comprises:
   updating a registry database to set the indication to run during a deployment stage; and
   copying the at least one hardware file associated with the indication to a storage location on a hard disk of the computer associated with the at least one hardware device.

16. A non-transitory computer readable medium comprising code which when executed by a computer performs the method of claim 1.

17. A system comprising:
   a computer processor configured to install a base system image to a first portion of memory of a computer;
   a processing logic of the computer, configured to:
     create a module comprising hardware files, wherein the hardware files are represented as a set of nodes, each node including identification of a corresponding hardware file, a node component identification (ID), at least one deployment condition for determining whether to install the hardware file to a target computer, and an indication of when to install the hardware file to the target computer;
     identify at least one hardware device associated with the computer;
     analyze the set of nodes from the module to identify a node having a node component ID that matches identification of the at least one hardware device associated with the computer;
     analyze the at least one hardware device to determine whether the at least one hardware device complies with the at least one deployment condition of the identified node based on a hardware attribute of the at least one hardware device; and
     install the at least one hardware file to a second portion of memory of the computer in the event the at least one hardware device complies with the at least one deployment condition,
   wherein the at least one installed hardware file is associated with the at least one identified hardware device, and
   wherein the indication associated with the identified node indicates installing of the at least one hardware file after the installing of the base system image and before the initial boot of an operating system contained in the base system image.

18. The system of claim 17, wherein installing the at least one hardware file further comprises:

determining that the at least one hardware device is used during booting of the computer; and injecting the at least one hardware file during a pre-installation environment, wherein injecting the at least one hardware file further comprises:

analyzing a registry database to identify a storage location on a hard disk associated with the at least one hardware device; and storing the at least one hardware file at the storage location.

19. The system of claim 17, wherein installing the at least one hardware file further comprises:

updating a registry database to set the indication to run during a deployment stage; and copying the at least one hardware file associated with the indication to a storage location on a hard disk of the computer associated with the at least one hardware device.

20. The system of claim 17, wherein the base system image includes information common to a plurality of computers.

21. A method comprising:

creating a module comprising hardware files, wherein the hardware files are represented as a set of nodes, each node including identification of a corresponding hardware file, a node component identification (ID), at least one deployment condition for determining whether to install the hardware file to a target computer, and an indication of when to install the hardware file to the target computer;

installing a base system image to a computer;

identifying at least one hardware device associated with the computer;

analyzing the set of nodes from the module to identify a node having a node component ID that matches identification of the at least one hardware device associated with the computer;

analyzing the at least one hardware device to determine whether the at least one hardware device complies with the at least one deployment condition of the identified node based on a hardware attribute of the at least one hardware device; and installing the at least one hardware file to the computer in the event the at least one hardware device complies with the at least one deployment condition, wherein the at least one installed hardware file is associated with the at least one identified hardware device, wherein the base system image does not include device-specific hardware files and is installed to a first portion of a memory before the at least one hardware device is installed and the installing the at least one hardware file is indicated by the indication associated with the identified node to occur before the initial boot of an operating system contained in the base system image.

22. The method of claim 21, wherein the base system image includes information common to a plurality of computers.

23. The method of claim 21, wherein installing the at least one hardware file further comprises:

determining that the at least one hardware device is used during booting of the computer; and injecting the at least one hardware file during a pre-installation environment, wherein injecting the at least one hardware file further comprises:

analyzing a registry database to identify a storage location on a hard disk associated with the at least one hardware device; and storing the at least one hardware file at the storage location.

24. The method of claim 21, wherein installing the at least one hardware file further comprises:

updating a registry database to set the indication to run during a deployment stage; and copying the at least one hardware file associated with the indication to a storage location on a hard disk of the computer associated with the at least one hardware device.

25. A method comprising:

creating a module comprising hardware files, wherein the hardware files are represented as a set of nodes, each node including identification of a corresponding hardware file, a node component identification (ID), at least one deployment condition for determining whether to install the hardware file to a target computer, and an indication of when to install the hardware file to the target computer;

installing a base system image to a first portion of memory in a computer;

identifying at least one hardware device associated with the computer;

analyzing the set of nodes from the module to identify a node having a node component ID that matches identification of the at least one hardware device associated with the computer;

analyzing the at least one hardware device to determine whether the at least one hardware device complies with the at least one deployment condition of the identified node based on a hardware attribute of the at least one hardware device; and installing the at least one hardware file to a second portion of memory in the computer in the event the at least one hardware device complies with the at least one deployment condition, wherein the at least one installed hardware file is associated with the at least one identified hardware device, and wherein the at least one hardware file is installed after the base system image is installed and before the initial boot of an operating system contained in the base system image, as indicated in the indication associated with the identified node.

26. The method of claim 25, wherein installing the at least one hardware file further comprises:

determining that the at least one hardware device is used during booting of the computer; and injecting the at least one hardware file during a pre-installation environment, wherein injecting the at least one hardware file further comprises:

analyzing a registry database to identify a storage location on a hard disk associated with the at least one hardware device; and storing the at least one hardware file at the storage location.

27. The method of claim 25, wherein installing the at least one hardware file further comprises:

updating a registry database to set the indication to run during a deployment stage; and copying the at least one hardware file associated with the indication to a storage location on a hard disk of the computer associated with the at least one hardware device.

28. The method of claim 25, wherein identifying at least one hardware device further comprises:
- mounting a registry database of the computer;
- querying the computer to identify a hardware configuration file; and
- identifying a hardware abstraction layer type of the computer based on the hardware configuration file.

29. The method of claim 28, wherein identifying at least one hardware device further comprises:
- copying a hardware abstraction layer support file to the computer based on the hardware abstraction layer type; and
- updating the registry database to point to the hardware abstraction layer support file.

30. The method of claim 25, wherein the base system image includes information common to a plurality of computers.

* * * * *